United States Patent [19]

Bier

[11] 4,254,011

[45] Mar. 3, 1981

[54] FLAME RETARDED POLYETHYLENE TEREPHTHALATE COMPOSITIONS WITH IMPROVED DRIP SUPPRESSION

[75] Inventor: Peter Bier, New Martinsville, W. Va.

[73] Assignee: Bayer Aktiengesellschaft, Leverkusen, Fed. Rep. of Germany

[21] Appl. No.: 95,273

[22] Filed: Nov. 19, 1979

[51] Int. Cl.³ .............................................. C08L 67/00
[52] U.S. Cl. ........................ 260/40 R; 260/45.7 R; 260/45.7 P; 260/45.7 S; 260/45.75 B; 260/45.75 C; 260/45.8 N; 260/45.9 R; 260/45.95 H; 525/64
[58] Field of Search ........... 260/40 R, 45.7 R, 45.7 P, 260/45.7 S, 45.75 B, 45.75 C, 45.9 R, 45.95 H, 45.8 N; 525/64

[56] References Cited

U.S. PATENT DOCUMENTS

| | | | |
|---|---|---|---|
| 3,671,487 | 6/1972 | Abolins | 260/40 R |
| 3,808,180 | 4/1974 | Owens | 525/293 |
| 4,096,202 | 6/1978 | Farnham et al. | 260/40 R |

*Primary Examiner*—J. Ziegler
*Attorney, Agent, or Firm*—Gene Harsh; Lawrence S. Pope

[57] ABSTRACT

This disclosure is concerned with flame retarded polyethylene terephthalate compositions which have enhanced drip suppression due to the incorporation of a two-phase polyacrylate comprised of a cross-linked elastomeric first phase to which a rigid thermoplastic second phase has been grafted. These compositions have enhanced crystallization velocities and therefore may be molded into colder molds and with shorter mold cycles than has been conventional for polyethylene terephthalate compositions.

8 Claims, No Drawings

FLAME RETARDED POLYETHYLENE TEREPHTHALATE COMPOSITIONS WITH IMPROVED DRIP SUPPRESSION

BACKGROUND OF THE INVENTION

Polyethylene terephthalate (PET) is particularly suitable for the manufacture of fibers, filaments and sheets. PET, however, is not generally suitable for injection molding because of the high molding temperatures (e.g. around 140° C.) and the relatively long molding times required. These severe processing conditions have generally prevented the widespread use of polyethylene terephthalate for injection molding despite the fact that products molded under these severe conditions exhibit high rigidity and high heat distortion temperatures. The high mold temperatures required are beyond the equipment capabilities of many mold shops which have only water heated molds. Such molds are normally capable of temperatures no higher than about 110° C. Thus, wide use of this polymer is restricted not only by the economics of its long processing cycle but also by the inability of many potential molders to process the resin.

In the production of molded polyester resins, it is generally known to add one or more fire retardant additives to enhance the fire resisting properties of the resin. Although it is generally relatively simple to modify a polyester resin to render it substantially nonflammable, one particular problem is the formation of hot drops of resin which form when the product is subjected to a flame source. Obviously, under true fire conditions the formation of such drops could cause further flame spread. (One known method for testing the ability of a material to avoid dripping is UL-94 and UL-94-5V).

One of the objects of the present invention is to provide polyethylene terephthalate compositions which do not readily form drips under UL-94 and UL-94-5V conditions. Another object of the present invention is to provide polyethylene terephthalate compositions which can be molded at lower temperatures and more rapidly than has previously been possible. It is an object of this invention to obtain compositions which additionally have heat distortion temperatures substantially the same as those obtained when molding under the above-noted severe conditions.

SUMMARY OF THE INVENTION

The present invention relates to novel thermoplastic compositions which are based on polyethylene terephthalates which suppress drip formation, which can be molded at temperatures of less than about 120° C. and which, in some combinations, will exhibit heat distortion temperatures substantially the same as those obtained when molding at temperatures in the area of 140° C. The compositions of the instant invention also exhibit other enhanced fire retardant properties. Finally, the present invention relates to an improved injection molding process using the compositions of the invention.

The present invention broadly comprises a thermoplastic composition comprising (a) from 40 to 95%, preferably from 50 to 65%, by weight of a polyethylene terephthalate having an intrinsic viscosity of at least about 0.3 dl/g, preferably at least about 0.5 dl/g, measured as a 0.5% by weight solution in a 1:1 mixture of phenol and tetrachloroethane at 25° C., (b) from 2 to 30%, preferably from 5 to 20%, by weight of a multiphase composite interpolymer comprising (i) from about 25 to 95 weight percent of a first elastomeric phase polymerized from a monomer system comprising about 75 to 99.8% by weight $C_1$ to $C_6$ alkyl acrylates, 0.1 to 5% by weight crosslinking monomer, 0.1 to 5% by weight graftlinking monomer, said crosslinking monomer being a polyethylenically unsaturated monomer having a plurality of addition polymerizable reactive groups, all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and (ii) from about 75 to 5 weight percent of a final, rigid thermoplastic phase which is polymerized in the presence of said elastomeric phase and which is free of epoxy groups;

(c) at least sufficient flame retardant to impart a UL-94-VO at $\frac{1}{8}''$ rating to the polyethylene terephthalate alone, preferably from 3 to 20%, more preferably from 5 to 15%, by weight of a fire retardant, which most preferably is an organic compound containing at least one imide group and having a melting point greater than 240° C. in combination with an antimony compound such as $Sb_2O_3$; and (d) from 0 to 50%, preferably from 20 to 45%, by weight of glass fibers.

The instant invention also relates to a process for injection molding comprising (a) intimately blending the components noted above, and (b) injection molding the resultant blend into a mold held at a temperature of no more than 120° C.

DETAILED DESCRIPTION OF THE INVENTION

The invention is directed broadly to an at least three- and preferably four-component composition, i.e. a polyethylene terephthalate, a multiphase composite interpolymer, the fire retardant, and optionally glass fibers.

The dicarboxylic acid component of the polyethylene terephthalate (a) consists mainly of terephthalic acid and may contain up to 10 mol %, based on the total mols of acid of other aromatic dicarboxylic acids having from 6 to 14 carbon atoms, of aliphatic dicarboxylic acids having from 4 to 8 carbon atoms or of cycloaliphatic dicarboxylic acids having from 8 to 12 carbon atoms. Examples of such dicarboxylic acids which may be included with terephthalic acid are phthalic acid, isophthalic acid, naphthalene-2,6-dicarboxylic acid, diphenyl-4,4'-dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mol % of branching agent, based on the quantity of acid component.

Polyethylene terephthalates derived mainly from terephthalic acid and ethylene glycol are preferred and homopolyethylene terephthalate, i.e. a product produced substantially only from ethylene glycol and terephthalate acid or its esters, or its anhydride is most preferred.

The polyethylene terephthalate can be prepared in known manner by (a) esterification or transesterification of terephthalic acid and/or of the corresponding dialkylterephthalates, preferably the dimethyl ester, with from 1.05 to 5.0 mol, preferably from 1.4 to 3.6 mol of the diol, based on 1 mol of the dicarboxylic acid component, and optionally the branching agent, in the presence of esterification and/or transesterification catalysts (first stage), and (b) polycondensation of the resulting reaction products in the presence of polycondensation catalysts at temperatures between 200° and 320° C. at reduced pressure (preferably below 1 Torr) (second stage).

Both the first step (a) and the second step (b) of condensation are usually carried out in the presence of catalysts, e.g. those described by R. E. Wilfong in J. Polym. Sci. 54, 385 (1961). Some of these catalysts (A) are more powerful accelerators of the esterification reaction (a), others (B) for the polycondensation reaction (b), and still others (C) are fairly active for both (a) and (b).

The following are examples of catalysts (A) which are suitable for accelerating reaction (a):

1. Lithium, sodium, potassium, calcium, strontium and boron in the form of the metals or their oxides, hydrides, formates, acetates, alcoholates, or glycolates;
2. Calcium and strontium chlorides and bromides;
3. Tertiary amines;
4. Calcium and strontium malonates, adipates, benzoates, etc.;
5. Lithium salts of dithiocarbamic acids.

The following are examples of catalysts (B) suitable for the polycondensation reaction (b):

1. Molybdenum, germanium, lead, tin and antimony in the form of the metals or their oxides, hydrides, formates, alcoholates or glycolates;
2. Zinc and lead perborates and borates;
3. Zinc, manganese(II), cobalt, magnesium, chromium, iron and cadmium succinates, butyrates, adipates or enolates of a diketone;
4. Zinc chloride and bromide;
5. Lanthanum dioxide and titanate;
6. Neodymium chloride;
7. Mixed salts of antimony, e.g. potassium antimony tartrate, and salts of antimonic acids, such as potassium pyroantimonate;
8. Zinc or manganese salts of dithiocarbamic acids;
9. Cobalt naphthenate;
10. Titanium tetrafluoride or tetrachloride;
11. Alkyl ortho-titanates;
12. Titanium tetrachloride ether complexes;
13. Quaternary ammonium salts carrying a titanium hexaalkoxy group; titanium tetraalkoxides, alkali metal or alkaline earth metal compounds of aluminum, zirconium or titanium alkoxides;
14. Organic quaternary ammonium, sulphonium, phosphonium and oxonium hydroxides and salts;
15. Barium malonate, adipate, benzoate, etc.;
16. Lead, zinc, cadmium or manganese salts of the monoalkyl ester of a phenylene dicarboxylic acid;
17. Antimony catechuic complexes with an amino alcohol or with an amine and an alcohol;
18. Uranium trioxide, tetrahalide, nitrate, sulphate or acetate.

The following are examples of catalysts (C) which are suitable for accelerating both steps (a) and (b) of the reaction:

1. Barium, magnesium, zinc, cadmium, aluminum, manganese and cobalt as the metals or their oxides, hydrides, formates, alcoholates, glycolates or preferably, as acetates;
2. Aluminum chloride and bromide;
3. Zinc, manganese(II), cobalt, magnesium, chromium, iron and cadmium succinates, butyrates, adipates, or enolates of a diketone.

The most suitable compounds for use as catalysts (A) are calcium, zinc and manganese salts, particularly the acetates.

The most suitable catalysts (B) are the compounds of zinc, manganese, cobalt, antimony, germanium, titanium and tin, e.g. zinc and manganese acetate, antimony trioxide, trichloride and triacetate, and germanium dioxide and tetrachloride.

The most suitable catalysts (C) are particularly the titanium compounds, e.g. tetraalkyltitanium acid esters having alkyl groups with from 1 to 10 carbon atoms, such as tetraisopropyltitanate and tetrabutyltitanate.

The catalysts are used in quantities of from 0.001 to 0.2% by weight, based on the dicarboxylic acid components.

Inhibitors may be added in the process to inhibit the catalysts (A) after completion of the first reaction step (a) and to increase the stability of the end product (cf. "Polyesterfasern" by H. Ludewig, 2nd Edition, publishers Akademie-Verlag, Berlin 1974). The following are examples of such inhibitors: phosphoric acid, phosphorous acid and aliphatic, aromatic and araliphatic esters thereof, e.g. the alkyl esters having from 6 to 18 carbon atoms in the alcohol component, phenyl esters in which the phenyl groups can carry 1 to 3 substituents having 6 to 18 carbon atoms, such as trinonylphenyl phosphate, dodecyl phenyl phosphate or triphenyl phosphate. These inhibitors are usually added in quantities of from 0.01 to 0.6% by weight, based on the dicarboxylic acid component.

In order to obtain an even higher molecular weight, the polyethylene terephthalates may be subjected to a solid phase polycondensation. This is generally carried out by subjecting the granulated product to a temperature which is from 60° to 6° C. below the melting point of the polymer, either in a stream of nitrogen or under a vacuum of less than 1 Torr.

The second component of the composition of the invention is a multiphase composite interpolymer comprising about 25 to 95 weight percent of a first elastomeric phase and about 75 to 5 weight percent of a final rigid thermoplastic phase. One or more intermediate phases are optional, for example a middle stage polymerized from about 75 to 100% by weight styrene. The first stage is polymerized from about 75 to 99.8 weight percent $C_1$ to $C_6$ acrylate resulting in an acrylic rubber core having a $T_g$ below about 10° C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and poly-methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95% by weight of the interpolymer and being polymerized from a monomer system comprising 95 to 99.8% by weight butyl acrylate, 0.1 to 2.5% by weight butylene diacrylate as crosslinking agent, 0.1 to 2.5% by weight allyl methacrylate or diallyl maleate as a graftlinking agent, with a final stage polymerized from about 60 to 100% by weight methyl methacrylate.

The final stage monomer system can be comprised of $C_1$ to $C_{16}$ methacrylate, styrene, acrylonitrile, alkyl acrylates, allyl methacrylate, diallyl methacrylate, and the like, as long as the over $T_g$ is at least 20° C. Preferably, the final stage monomer system is at least 50 weight percent $C_1$ to $C_4$ alkyl methacrylate. The presently preferred interpolymer is one produced in multiple stages using conventional emulsion polymerization techniques from N-butyl acrylate, 1,3-dibutylene diacrylate, and diallyl maleate in a first stage, and methyl methacrylate in the second stage. The monomer weight ratios in the preferred interpolymer of butylacrylate/1,3-butylene diacrylate/diallyl maleate/methyl methacrylate are 79.2/0.4/0.4/20.0. The interpolymers themselves are known to be impact modifiers for a variety of different resins including polyethylene terephthalates and are described as such, e.g. in U.S. Pat. No. 4,096,202 and their synthesis is described in U.S. Pat. No. 3,808,180, incorporated herein by reference.

The third component of the composition of the invention is a fire retardant system. It is used in at least a sufficient amount that if it alone were incorporated into the polyethylene terephthalate, it would impart a flame retardance of at least VO at $\frac{1}{8}''$ as measured by the UL-94 test. The flame retarding additives which can be used according to the invention comprise a large number of chemical compounds which are well known to those skilled in the art. In general, they contain chemical elements which are used because of their flame retarding capacity, for example bromine, chlorine, antimony, phosphorus and nitrogen. Suitable flame retardants are described in U.S. Pat. No. 4,136,089, incorporated herein by reference. Preferably, the flame retarding additives consist of halogenated organic compounds (brominated or chlorinated), optionally as a mixture with organic or inorganic antimony compounds, for example antimony trioxide; of elementary phosphorus or phosphorus compounds or of halogen-containing compounds as a mixture with phosphorus compounds or compounds which contain phosphorus-nitrogen bonds.

Halogen-containing compounds which can be used include those of the formula

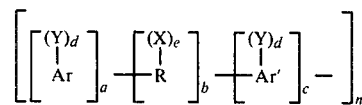

wherein n is an integer from 1 to 10 and

R is an alkylene, alkylidene or cycloaliphatic radical with 1 to 20 C atoms, for example methylene, ethylene, propylene, isopropylene, isopropylidene, butylene, isobutylene, amylene, cyclohexylene or cyclopentylidene, and R can also denote an oxygen atom, a carbonyl group, a sulphur atom or a sulphur-containing group, such as a sulphoxide or sulphone group, or a carbonate group or a phosphorus-containing group, R can also consist of two or more alkylene or aklylidene groups, which are linked together by groups such as aromatic radicals, oxygen atoms, ester groups or carbonyl groups, sulphur atoms, sulphoxide groups or sulphone groups or phosphorus-containing groupings, and finally, R can also be a dihydric phenol, such as bisphenol A, or a carbonate group, Ar and Ar' are monocarbocyclic or polycarbocyclic aromatic groups, such as phenylene, biphenylene, terphenylene, naphthylene and the like, Y denotes organic, inorganic or organo-metallic radicals and the substituents represented by Y comprise (1) halogen, such as chlorine, bromine, iodine or fluorine, or (2) hydroxyl or ether groups of the general formula OE, wherein E is a monovalent hydrocarbon radical, such as, for example, X or (3) monovalent hydrocarbon radicals of the type represented by R, or (4) other substituents, such as nitro or cyano, the substituents mentioned being substantially inert and a proviso being that at least 1 and preferably 2 halogen atoms are present per aryl nucleus, X is a monovalent hydrocarbon group with 1 to 20 C atoms and the following examples may be mentioned: alkyl, such as methyl, ethylene, propyl, isopropyl, butyl and decyl; aryl, such as phenyl, naphthyl, biphenyl, xylyl and tolyl; aralkyl, such as benzyl and ethylphenyl; and cycloaliphatic groups, such as cyclopentyl and cyclohexyl and when more than one grouping X is present, these groups can be identical or different, the letter d in the above formula represents an integer from 1 up to the maximum equivalent of the number of replaceable hydrogens, which are bonded to the aromatic rings Ar or Ar', the letter e represents 0 or an integer up to the maximum number of replaceable hydrogens on R, the letters a, b and c represent 0 or an integer, and if b is not 0, then neither a nor c can be 0, and otherwise either a or c but not both can be 0, while if b is 0, the aromatic radicals are linked together by a direct carbon-carbon bond. The hydroxyl and Y substituents on the aromatic radicals Ar and Ar' can be in the ortho-, meta- or para-position on the aromatic rings and the radicals can be linked to one another in any possible way.

The following examples of diaromatic compounds fall within the scope of the above formula: 2,2-bis-(3,5-dichlorophenyl)-propane, bis-(2-chlorophenyl)-methane, bis-(2,6-dibromophenyl)-methane, 1,1-bis-(4-iodophenyl)-ethane, 1,2-bis-(2,6-dichlorophenyl)-ethane, 1,1-bis-(2-chloro-4-iodophenyl)-ethane, 1,1-bis-(2-chloro-4-methylphenyl)-ethane, 1,1-bis-(3,5-dichlorophenyl)-ethane, 2,2-bis-(3-phenyl-4-bromo phenyl)-ethane, 2,3-bis-(4,6-dichloronaphthyl)-propane, 2,2-bis-(2,6-dichlorophenyl)-pentane, 2,2-bis-(3,5-dichlorophenyl)-hexane, bis-(4-chlorophenyl)-phenylmethane, bis-(3,5-dichlorophenyl)-cyclohexylmethane, bis-(3-nitro-4-bromophenyl)-methane, bis-(4-hydroxy-2,6-dichloro-3-methoxyphenyl)-methane, 2,2-bis-(3,5-dichloro-4-hydroxyphenyl)-propane and 2,2-bis-(3-bromo-4-hydroxyphenyl)-propane.

Substituted benzenes, such as, for example, tetrabromobenzene, hexachlorobenzene and hexabromobenzene, and biphenyls, such as 2,2'-dichlorobiphenyl, 2,4'-dibromobiphenyl, 2,4'-dichlorobiphenyl, hexabromobiphenyl, octabromobiphenyl and decabromobiphenyl, and halogenated diphenyl ethers which contain 2 to 10 halogen atoms also fall within the scope of the above structural formula.

The preferred halogen compounds within the scope of this invention are aromatic halogen compounds, such as chlorinated benzene, brominated benzene, chlorinated biphenyl, chlorinated terphenyl, brominated biphenyl or brominated terphenyl or a compound which comprises two phenyl radicals, which are linked together by a divalent alkylene group, and carries at least chlorine atoms or bromine atoms per phenyl nucleus.

Hexabromobenzene and brominated or chlorinated biphenyls or terphenyls, alone or as a mixture with antimony trioxide, are particularly preferred.

In general, the preferred phosphorus compounds are selected from elementary phosphorus or organic phosphonic acids, phosphonates, phosphinates, phosphonites, phosphinites, phosphene oxides, phosphenenes, phosphites or phosphates.

Triphenylphosphine oxide is an example of this category of compounds. It can be used either alone or as a mixture with hexabromobenzene or a chlorinated biphenyl and optionally antimony trioxide.

Typical preferred phosphorus compounds, which can be used within the scope of the present invention, are those of the formula

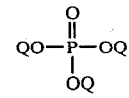

and their nitrogen analogues, wherein Q represents identical or different radicals, including hydrocarbon radicals, such as alkyl, cycloalkyl, aryl, alkyl-substituted aryl and aryl-substituted alkyl; halogen, hydrogen or combinations thereof, with the proviso that at least one of the radicals Q is an aryl radical. Typical examples of suitable phosphates comprise the following: phenyl bis-dodecyl phosphate, phenyl bis-neopentyl phosphate, phenyl ethylene hydrogen phosphate, phenyl-bis-(3,5,5'-trimethylhexyl)phosphate, ethyl diphenyl phosphate, 2-ethylhexyl di-(p-tolyl) phosphate, diphenyl hydrogen phosphate, bis-(2-ethylhexyl)-p-tolyl phosphate, tritolyl phosphate, bis-(2-ethylhexyl)-phenyl phosphate, tri-(nonylphenyl)-phosphate, phenyl methyl hydrogen phosphate, di-(dodecyl-p-tolyl) phosphate, tricresyl phosphate, triphenyl phosphate, halogenated triphenyl phosphate, dibutyl phenyl phosphate, 2-chloroethyl diphenyl phosphate, p-tolyl bis-(2,5,5'-trimethylhexyl) phosphate and 2-ethylhexyl diphenyl phosphate.

Preferred phosphates are those in which each radical Q is of aromatic character. The most preferred phosphate is triphenyl phosphate. Triphenyl phosphate is also preferably employed in a combination with hexabromobenzene and optionally antimony trioxide.

Those compounds which contain phosphorus-nitrogen bonds, such as phosphonitrile chloride, phosphorus ester amides, phosphoric acid amides, phosphonic acid amides, phosphinic acid amides, tris-(aziridinyl)-phosphine oxide or tetrakis-(hydroxymethyl)-phosphonium chloride, can also be used as flame retarding additives.

Particularly preferred flame retarding additives are oligomers of a carbonate of a halogenated dihydric phenol. Of these oligomers, those which are preferred contain 2 to 20 recurrent units of the formula:

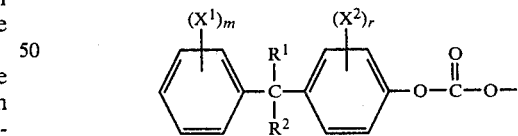

wherein
R$^1$ and R$^2$ are hydrogen, alkyl with 1 to 4 C atoms or phenyl,
X$^1$ and X$^2$ are bromine or chlorine and
m and r denote an integer from 1 to 4. These oligomeric additives have a low volatility when they are heated to temperatures above 200° C. and a softening point of less than about 300° C. They are employed alone or in combination with substances having a synergistic action such as inorganic or organic antimony compounds.

Presently, the most preferred flame retardants are halogen bearing organic compounds containing at least one imide group and having a melting point greater than 240° C. combined with inorganic or organic antimony compounds. Useful families of imide-group containing compounds include halogen bearing N,N'-arylene-diphthalimides, wherein the arylene group includes phenylene, diphenyl, naphthyl and sulphone bridged bisphenyls; tetrabrominated unsubstituted and alkyl substituted phthalimides and cyclohexyl dicarboximides; unsubstituted alkyl bridged and aryl bridged N,N'-bis-(dibromocyclohexane dicarboximides); and N,N'-alkylene bis-(tetrahalophthalimides).

Preferred imide-group containing compounds are those corresponding to the following formula:

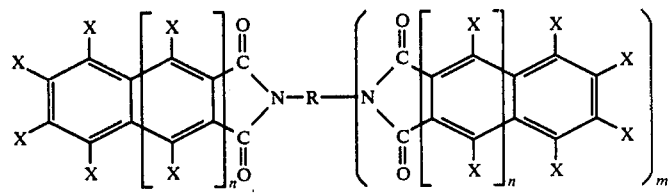

wherein
both n and m may be 1 or 0,
X may be halogen, particularly chlorine or bromine,
R is a $C_1$ to $C_6$ alkyl group, a single bond, a phenylene group, a toluene group, a cyclohexylene group, a bisphenyl methane group, a bis-cyclohexyl methane group, or a naphthylene group.

The N,N'-alkylenebis (tetrahalophthalimides) suitable in the present invention and a process for their production are described in U.S. Pat. No. 4,087,441, incorporated herein by reference. The preferred N,N'-alkylenebis (tetrahalophthalimides) are represented by the formula:

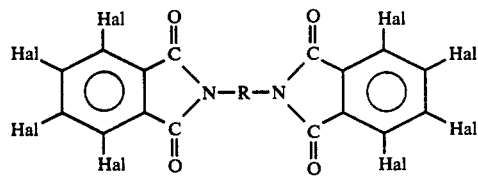

wherein
R represents a $C_1$–$C_6$ alkyl group, preferably a $C_2$–$C_6$ alkyl group, and most preferably an ethyl group, and
Hal, which may be the same or different, represents a halogen atom, preferably Br or Cl, and most preferably Br.

The most particularly preferred N,N'-alkylenebis (tetrahalophthalimide) is N,N'-ethylenebis (tetrabromophthalimide) (R is an ethyl group and Hal is a Br atom). The utility of these types of imide-group containing components is known to enhance fire retardant properties in polyethylene terephthalate (see e.g. Japanese patent application No. 75-119041) and other polyesters (see e.g. U.S. Pat. Nos. 3,624,024 and 3,873,567, and British Pat. No. 1,287,934). When the preferred imide containing compounds are used in compositions containing glass fibers, it has also been found that the heat distortion temperatures attainable are significantly higher than those using other fire retardants.

Other suitable imide-group containing compounds include 1,4,6-tetrabromo-2,3-phthaloimide (melting point in excess of 370° C.); N-methylol tetrabromo phthalimide (melting point in excess of 350° C.); N,N'-bis-(1,4,5,6-tetrabromo-2,3-phthaloimide) (melting point in excess of 350° C.); N,N'-p-phenylene-di-tetrachlorophthalimide; 4,4'-di-tetrachlorophthalimidobiphenyl; N-(tetrachlorophthalimido)-tetrachlorophthalimide; N,N'-p-phenylene di-tetrabromo phthalimide; N,N'-bis-(5,6-dibromo-cyclohexane-2,3-dicarboximide); and N,N'-(1,2-ethane)-bis-(5,6-dibromocyclohexane-2,3-dicarboximide). Further suitable imide containing compounds are disclosed in U.S. Pat. Nos. 3,868,388; 3,873,567; 3,915,930; 3,923,734; 4,001,179 and 4,003,862; and in allowed U.S. patent application Ser. No. 868,145 filed Jan. 9, 1978, all incorporated herein by reference. Further suitable imides are also disclosed in British Pat. No. 1,287,934.

The fourth, optional component of the composition of the invention is glass fibers. It has been found that substantially any of the types of glass fibers generally known and/or used in the art are useful in the present invention. Typical types are those described in British Pat. No. 1,111,012, U.S. Pat. No. 3,368,995 and German Auslegeschrift No. 2,042,447. The usefulness of any particular type of glass fiber does not depend on its average length. Thus, the average lengths useful cover a wide range. The presently preferred glass fibers have an average length of about 200 microns.

Glass filaments made of calcium-aluminum-boron silicate glass, which is relatively free from sodium carbonate, are preferably used. Glass of this type is known as "E" glass; however, where the electrical properties of the reinforced polyesters are not important, other glasses can also be used, for example the glass with a low sodium carbonate content which is known as "C" glass. The diameters of the filaments are in the range from about 0.003 to 0.018 mm, but this is not critical for the present invention.

The length of the glass filaments and whether they have been spun to give fibers and the fibers in turn have been bundled to give yarns, ropes or hanks or woven to give mats and the like is not critical for the invention. However, it is convenient to use fiber-like glass in the form of glass fiber staple about 3 to about 25 mm in length and preferably less than 6 mm in length for reinforcing the polyesters according to the invention. On the other hand, even shorter pieces are found in moldings produced from reinforced polyesters according to the invention since considerable comminution takes place during mixing. It is, however, desirable that the length of the filaments are between about $1.25 \times 10^{-3}$ and about 3 mm.

The amounts of components present may vary over a wide range. Generally, the compositions should contain from 40 to 95%, and preferably 50 to 65%, by weight of polyethylene terephthalate, from 0 to 50%, and preferably 20 to 45%, by weight of glass fibers, preferably from 3 to 20%, and more preferably 5 to 15%, by weight of the fire retardant additive, and from 2 to 30%, and preferably 5 to 20%, by weight of the interpolymer.

Injection molding conditions for polyethylene terephthalates are well known to those skilled in the art and are taught in U.S. Pat. No. 3,516,957, incorporated herein by reference, and *Injection Molding Theory and Practice*, by Ervin I. Rubin, published by Wiley Interscience, 1972. Generally, these conditions involve temperatures of between about 250° and 310° C., residence times at elevated temperatures of between about 1 and 15 minutes, pressures of up to about 20,000 psi and shear rates of between about 100 and 10,000 reciprocal seconds. These conditions may also include vacuums of down to 20 inches of Hg. Of course, these conditions also include mold temperatures of between about 100° and 200° C. but, as will become apparent, the composition of the present invention may be molded at lower temperatures and shorter mold times.

The mixtures of polyethylene terephthalates, interpolymer, fire retardant and, optionally, glass fibers can be obtained in usual commercial mixing apparatus such as kneaders and one-shaft or two-shaft screw extruders. The solidified melt of the mixtures can be granulated for further processing and this can be followed by a post-condensation in the solid phase.

The compositions of the present invention may be molded at temperatures of below about 120° C. and still yield high heat distortion temperatures and the superior mechanical and chemical properties which make these resins attractive for injection molded articles. When used in compositions of the present invention, these polymers may be molded under much less favorable conditions (colder molds, e.g. below about 120° C., and shorter residence time in the mold, e.g. less than about 60 seconds) and still display excellent properties and, in some instances, have heat distortion temperatures substantially similar to those obtainable under optimum conditions (i.e. high mold temperature and long residence time). Thus, the present invention includes a process for molding resins based primarily, and preferably solely, upon terephthalic acid and ethylene glycol at mold temperatures of less than about 120° C. while, in some instances, attaining heat distortion temperatures similar to those obtainable under optimum injection molding conditions with the polyester and glass fiber alone.

The process comprises intimately blending the terephthalic acid/ethylene glycol based resin, interpolymer, fire retardant and, optionally, glass fibers, and injection molding the composition so prepared into molds held at temperatures less than about 120° C., preferably less than about 110° C. The polyester consists of acid residues of which at least 90 mol % are derived from terephthalic acid and of alcohol residues of which at least 90 mol % are derived from ethylene glycol and most preferably is a homopolyethylene terephthalate. The other components of the polyester may be any of those discussed hereinabove as being suitable. The polyester should have a minimum intrinsic viscosity of about 0.3 dl/g, preferably 0.5 dl/g (measured as a 0.5% strength by weight solution in a phenol/tetrachloroethane mixture in a weight ratio of 1:1 at 25° C.).

In a preferred embodiment of this process aspect of the present invention, the residence time in the mold is significantly less than that required for the unmodified polyester (e.g. pure resin) in making the same part. For small, fairly simple parts this may be less than about 30 seconds, more preferably less than about 20 seconds and most preferably less than 10 seconds as compared to 40 seconds or more for unmodified resin. Of course, significant reductions in the mold residence time of resins modified with conventional additives such as micro talc nucleating agent are also obtained by further modifying these resins with appropriate amounts of the imide group containing compound of the present invention.

The usual quantities of stabilizers, preferably from 0.01 to 0.5% by weight, based on the weight of the polyethylene terephthalates can be added to protect against thermooxidative degradation. Suitable stabilizers include phenols and phenol derivatives, particularly sterically hindered phenols which have alkyl substituents with 1 to 6 carbon atoms in both ortho-positions to the phenolic hydroxyl group, amines, preferably secondary arylamines and their derivatives, phosphates and phosphites, preferably their aryl derivatives, quinones, copper salts of organic acids, addition compounds of copper (1) halides with phosphites, e.g. 4,4'-bis-(2,6-di-tert.-butylphenol); 1,3,5-trimethyl-2,4,6-tris-(3,5-di-tert.-butyl-4-hydroxybenzyl)-benzene; 4,4'-butylidene-bis-(6-tert.-butyl-m-cresol); 3,5-di-tert.-butyl-4-hydroxybenzyl-phosphonic acid diethyl ester; N,N'-bis-(β-naphthyl)-p-phenylenediamine; N,N'-bis-(1-methylheptyl)-p-phenylenediamine; phenyl-β-naphthylamine; 4,4'-bis-(α,α-dimethylbenzyl)-diphenylamine; 1,3,5-tris-(3,5-di-tert.-butyl-4-hydroxy-hydrocinnamoyl)-hexahydro-s-triazine; hydroquinone; p-benzoquinone, toluhydroquinone; p-tert.-butyl-pyrocatechol; chloranil; naphthoquinone; copper naphthenate; copper octoate; CU(I)Cl/triphenyl-phosphate; CU(I)Cl/trimethylphosphite; CU(I)Cl/tris-chloroethylphosphite; CU(I)Cl/tripropylphosphite; and p-nitrosodimethylaniline. Also suitable as stabilizing agents against molecular weight degradation from hydrolysis are carbodiimides.

Inorganic or organic pigments, dyes, lubricants and mold release agents such as zinc stearate, montan wax, UV absorbers and the like can also be added in the usual quantities.

The crystallization velocity of the thermoplastic polyester molding compositions can be increased by adding nucleating agents in quantities of from 0.01 to 1% by weight, based on the quantity of polyester. Compounds of this kind are known in the art (cf. Kunststoff-Handbuch, Volume VIII, "Polyester", Carl Hanser Verlag, Munich, 1973, page 701).

The thermoplastic compositions of this invention are suitable for the manufacture of all kinds of molded articles by injection molding and also for the production of film and fibers.

In all of the Examples which follow, the compositions were prepared for extrusion by tumbling polyethylene terephthalate pellets with all the indicated additives, all of which were in powder form, for two and one-half minutes and then, when indicated, the composition was tumbled an additional twenty seconds with the chopped strand glass fibers.

These tumble blended compositions were extruded to pellets in a Waldron-Hartig 1½" single screw extruder with a 24:1 L/D barrel, non-vented and fitted with a 2.75:1 CR screw (feed, 6 flights; meter 12 flights at 0.115 inches) containing four rows of mixing pins 5.25 inches apart and each pin 0.25 inches apart. A 40,60,20 mesh screen assembly was used except when fiberglass or $Sb_2O_3$ were part of the composition. The temperature profile was 250° C. at the rear, middle, front and die. The melt temperature was 255°–260° C., the die pressure was 0 psi and the screw was operated at 50 rpm.

Test specimens were molded from the extruded pellets using a Newbury Industries 3 oz. capacity ¾" reciprocal screw injection machine, Model H3-75RS. The thermal profile was 250° C. at the rear, front and nozzle. No primary injection was used, the secondary injection time was ten seconds and the cure time was ten seconds for a cycle time of twenty seconds. The primary pressure was 560 psi, the secondary pressure was 0 psi and the back pressure was 50 psi. The ram speed was 70% of maximum.

The mold was held at a temperature of 100° C. and consisted of a family of cavities providing:

2×3 inch color chip stepped to 0.1 and 0.125 inch thickness
½×5×¼" bar
2½×2½×⅛" bars
½×7×0.275" to 0.060 tapered bar
½×5×1/16" bar.

All cavities were chrome plated DME No. 3 steel, and were equipped with runner shutoffs.

As noted in the Examples, many different properties were measured and/or tested. Certain of the Examples indicate UL subject 94 testing. For this test, test specimens molded 5 in×0.5 in×0.125 in (127 mm×12.7 mm×3.2 mm) or 5 in×0.5 in×0.062 in (127 mm×12.7 mm×1.6 mm) dimensions were mounted vertically so that the bottom of the specimen was 12 in (305 mm) above a swatch of surgical cotton. A complete set of specimens consists of 5 sample bars of each size (⅛" and 1/16").

Each test bar was individually ignited for two successive 10 second ignitions and the burning characteristics after each ignition were noted and the sample rated. A Bunsen burner of defined dimensions is used to ignite the sample with a ⅜" (10 mm) blue flame from natural gas having approximately 1000 BTU/ft³ heat content. If only one specimen falls out of the defined rating for the rest of the set, a complete 5 specimen test is made and rated as the lowest result. The rating system is as follows (from best to lowest).

UL 94-V-O classification shall:

1. not contain any samples which burn for more than 10 seconds after each application of the test flame,
2. not have a total flaming time more than 50 seconds for the 10 flame applications of each set (5 samples),
3. not have any specimens which burn completely up to the holding clamp,
4. not have any specimens which ignite the cotton (below the specimen) with flaming drips or particles,
5. not have any specimens which glow longer than 30 seconds after removal of the test flame.

UL 94-V-2 classification shall:

1. not have any specimens which burn longer than 30 seconds after removal of test flame,
2. not have a total burn time longer than 250 seconds for the 10 flame applications for each set (5 samples),
3. not have any specimens that burn completely up to the holding clamp,
4. have specimens which ignite the cotton (below the sample) with burning drips or particles,
5. not have any specimens which glow longer than 60 seconds after removal of test flame,
6. not have any specimens which turn beyond the 4 in (101.6 mm) reference mark when ignited in a horizontal mounting position.

Certain other of the Examples indicate testing according to UL subject 94-5V. According to the test, five test specimens molded in 5 in×0.5 in×0.25 (or 0.062 in) dimensions were mounted vertically. A Bunsen burner is supported on the inclined plane of a mounting block so that the burner tube may be positioned at 20° from the vertical. The flame is then applied to one of the lower corners of the specimen so that the tip of the blue cone touches the specimen. The flame is applied for five seconds and removed for five seconds, and the operation is repeated for five applications of the test flame. After the fifth removal of the test flame, the specimen is rated. To be classified 94-5V, the specimen must A. not have any specimens which burn with flaming and/or glowing combustion for more than 60 seconds after the fifth flame;
B. not have any specimens which drip any particles;
C. not have any specimens which are destroyed to a significant degree in the area of the test flame.

Where indicated, the heat distortion temperature (HDT, °C.) was obtained following ASTM D-648. This test method consists in holding the specimen at two support points separated by five inches. The temperature is then raised at the rate of 2° C. per minute with application of a load of 264 psi at the midpoint. The temperature when the deformation of the specimen has reached 1/100 inch is the heat distortion temperature.

Where indicated, Impact Strength, Izod was obtained using ASTM Method D-256, Method A; tensile strength was obtained using ASTM Method D-638, Speed B for glass fiber containing systems and Speed C for other systems; and, flexural properties were obtained using ASTM Method D-790.

In the Examples which follow, the following materials were used:

TENITE 7741: A polyethylene terephthalate available from Eastman Kodak, having an intrinsic viscosity of 0.54 dl/g measured as a 0.5% by weight solution in a 1:1 mixture of phenol and tetrachloroethane at 25° C.

VFR 5041: A polyethylene terephthalate available from Goodyear, having an intrinsic vicsosity of 1.04 dl/g measured as a 0.5% by weight solution in a 1:1 mixture of phenol and tetrachloroethane at 25° C.

K419AA: Chopped strand glass fiber available from Owens Corning Fiberglas.

BT-93:

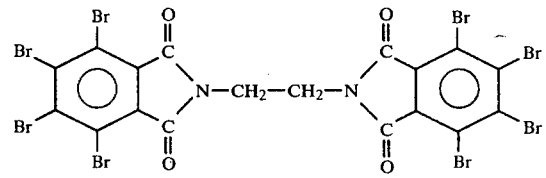

Melting point ~450° C.

Sb₂O₃: Antimony trioxide.

DBDPE: Decabromodiphenyl ether.

TBBP-PC: Tetrabromo bisphenol oligocarbonate, made from the phosgenation of 2,2-bis-(3,5-dibromo-4-hydroxyphenyl) propane to a polymerization degree of about 12 with phenol chain termination.

The compositions of Table I contained a nucleating amount of micro talc and a low level (less than 0.3 wt.%) of a stabilizer system not believed to affect the crystallization behavior or burning characteristics of the compositions. The compositions of Examples 12 to 15 and Comparison Examples 6 and 7 also contained an analogous stabilizer system.

KM330: A multiphase composite interpolymer available from Rohm and Haas and corresponding to the composition described in Example 26 of U.S. Pat. No. 4,096,202, based on n-butyl acrylate, 1,3-butylene diacrylate, diallyl maleate, and methyl methacrylate.

EXAMPLES

EXAMPLES 1-2 AND COMPARISON EXAMPLES 1-2

The materials and amounts of materials (in parts by weight) were as indicated in TABLE I. The results of the UL subject 94 and UL subject 94-5V tests were as indicated.

TABLE I

|  | EXAMPLE 1 | COMPARISON EXAMPLE 1 | COMPARISON EXAMPLE 2 | EXAMPLE 2 |
|---|---|---|---|---|
| TENITE 7741 | 6.8 | 8.0 | 5.6 | 4.76 |
| BT-93 | 1.5 | 1.5 | 1.05 | 1.05 |
| $Sb_2O_3$ | 0.5 | 0.5 | 0.35 | 0.35 |
| KM 330 | 1.2 | — | — | 0.84 |
| K419AA | — | — | 3.0 | 3.0 |
| UL 94 - 0.125 in. thick | V-O | V-O | — | — |
| UL 94-5V 0.250 in. thick | Passed | Failed Drip occurred on each specimen after 5th flame application | — | — |
| UL 94 - .060 in. | — | —V-O | V-O | Passed |
| UL 94-5V - .060 in. | — | — | Failed Drip occurred on each specimen after 3rd or 4th application |  |

TABLE II

|  | Comparison Example 4 | EXAMPLES | | | | | | Comparison Example 5 | EXAMPLES | | | | | |
|---|---|---|---|---|---|---|---|---|---|---|---|---|---|---|
|  |  | 3 | 4 | 5 | 6 | 7 | 8 |  | 6 | 7 | 8 | 9 | 10 | 11 |
| VFR5041 | 8.0 | 8.02 | 7.94 | 7.70 | 7.29 | 6.89 | 6.48 | 8.5 | 8.42 | 8.33 | 8.08 | 7.65 | 7.23 | 6.8 |
| $Sb_2O_3$ | 0.5 | 0.5 | 0.5 | 0.5 | 0.5 | 0.5 | 0.5 | 0.5 | 0.5 | 0.5 | 0.5 | 0.5 | 0.5 | 0.5 |
| KM330 | — | 0.08 | 0.16 | 0.4 | 0.81 | 1.21 | 1.62 | — | 0.09 | 0.17 | 0.43 | 0.85 | 1.28 | 1.7 |
| TBBP-PC | 1.4 | 1.4 | 1.4 | 1.4 | 1.4 | 1.4 | 1.4 | — | — | — | — | — | — | — |
| K419AA | — | — | — | — | — | — | — | — | — | — | — | — | — | — |
| DBOPE | — | — | — | — | — | — | — | 1.0 | 1.0 | 1.0 | 1.0 | 1.0 | 1.0 | 1.0 |
| IZOD, J/M ⅛") Notched | 80 | 25 | 28 | 26 | 32 | 42 | 75 | 27 | 45 | 29 | 30 | 55 | 107 | 77 |
| Unnotched | 346 | 741 | 1091 | 836 | 768 | 1596 | 1591 | 491 | 411 | 1494 | 1541 | 1590 | 1587 | 1562 |
| UL-94 1/16" | V-0 | V-2 | V-0 | V-0 | V-0 | V-0 | V-2 | V-0 | V-0 60% V-2 40% | V-2 80% V-0 20% | V-0 | V-0 | V-O 80% V-2 20% | V-2 80% V-0 20% |

|  | Comparison Example 6 | EXAMPLES | | | | |
|---|---|---|---|---|---|---|
|  |  | 7 | 12 | 13 | 14 | 15 |
| VFR 5041 | 5.95 | 5.67 | 4.82 | 4.54 | 5.36 | 5.06 |
| $Sb_2O_3$ | .35 | .35 | .35 | .35 | .35 | .35 |
| KM330 | — | — | 0.85 | 1.13 | 0.59 | 0.89 |
| TBBP-PC | — | 0.98 | 0.98 | 0.98 | — | — |
| K419AA | 3 | 3 | 3 | 3 | 3 | 3 |
| DBDPE | 0.7 | — | — | — | 0.7 | 0.7 |
| IZOD, J/M ⅛" Notched | 50 | 53 | 94 | 98 | 75 | 89 |
| Unotched | 683 | 687 | 801 | 874 | 709 | 741 |
| UL-94 1/16" Unnotched | V-0 | V-0 | V-0 | V-0 | V-0 | V-2 80% V-0 20% |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (a) a flame retarded polyethylene terephthalate having an intrinsic viscosity of at least 0.3 dl/g measured as a 0.5% by weight solution in a 1:1 mixture of phenol and tetrachloroethane at 25° C. and containing at least sufficient flame retardant to display a UL-94 rating at ⅛" of VO, and (b) from 2 to 30%, by weight, of a multiphase composite interpolymer comprising
  (i) from about 25 to 95 weight percent of a first elastomeric phase polymerized from a monomer system comprising about 75 to 99.8%, by weight, $C_1$ to $C_6$ alkylacrylate, 0.1 to 5%, by weight, crosslinking monomer, 0.1 to 5%, by weight, graftlinking monomer, said crosslinking monomer being a polyethylenically unsaturated monomer having a plurality of addition polymerizable reactive groups, all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and
  (ii) from about 75 to 5 weight percent of a final, rigid thermoplastic phase which is polymerized in the presence of said elastomeric phase and which is free of epoxy groups.

2. A thermoplastic composition comprising
(a) a polyethylene terephthalate having an intrinsic viscosity of at least 0.3 dl/g measured as a 0.5%, by weight, solution in a 1:1 mixture of phenol and tetrachloroethane at 25° C.,
(b) from 2 to 30%, by weight, based on component (a), of a multiphase composite interpolymer comprising
  (i) from about 25 to 95 weight percent of a first elastomeric phase polymerized from a monomer system comprising about 75 to 99.8%, by weight, $C_1$ to $C_6$ alkylacrylate, 0.1 to 5%, by weight, crosslinking monomer, 0.1 to 5%, by weight, graftlinking monomer, said crosslinking monomer being a polyethylenically unsaturated monomer having a plurality of addition polymerizable reactive groups, all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and
  (ii) from about 75 to 5 weight percent of a final, rigid thermoplastic phase which is polymerized in the presence of said elastomeric base and which is free of epoxy groups;
(c) from 3 to 20%, by weight, based on component (a) of a fire retardant, and
(d) from 0 to 50%, by weight, based on component (a) of glass fibers.

3. The composition of claim 1, wherein at least sufficient composite interpolymer is present to provide a passing rating at 0.250 inches in the UL-94-5V test.

4. The composition of claim 1, wherein at least sufficient composite interpolymer and glass fibers are present to provide a passing rating at 0.062 inches in the UL-94-5V test.

5. The composition of claim 2, wherein the flame retardant includes an organic compound containing at least one imide group and having a melting point greater than 240° C.

6. The composition of claim 2, wherein the composite interpolymer has an allyl methacrylate or diallylmaleate graftlinker and a butylene diacrylate crosslinker.

7. The composition of claim 6, wherein the composite interpolymer has only two phases, the first phase comprising about 60 to 95%, by weight, of said interpolymer and being polymerized from 95 to 99.8%, by weight, of butyl acrylate, 0.1 to 2.5%, by weight, of butylene diacrylate as a crosslinking agent and 0.1 to 2.5%, by weight, of allyl methacrylate or diallylmaleate as a graftlinking agent and said final phase is polymerized from about 60 to 100%, by weight, of methyl methacrylate.

8. The composition of claim 1 or 7 comprising (a) 50 to 65 wt % of a polyethylene terephthalate having an intrinsic viscosity of at least 0.5 dl/g,
(b) 5 to 20 wt % of the multiphase composite interpolymer,
(c) 5 to 15 wt % of a flame retardant, and 20 to 45 wt % of glass fibers.

* * * * *